United States Patent
Gill et al.

(10) Patent No.: US 7,317,845 B2
(45) Date of Patent: Jan. 8, 2008

(54) OPTICAL MODULATOR HAVING REDUCED BANDWIDTH REQUIREMENTS AND METHOD OF OPERATION THEREOF

(75) Inventors: Douglas M. Gill, South Orange, NJ (US); Xiang Liu, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 217 days.

(21) Appl. No.: 10/875,015

(22) Filed: Jun. 23, 2004

(65) Prior Publication Data
US 2005/0286825 A1 Dec. 29, 2005

(51) Int. Cl.
*G02F 1/035* (2006.01)
(52) U.S. Cl. .................. 385/3; 398/182; 398/183; 398/184; 398/185; 398/187; 398/188; 359/237; 359/245; 359/246; 359/254; 359/279
(58) Field of Classification Search ........ 398/182–188, 398/200–201; 385/3; 359/237, 245–246, 359/279
See application file for complete search history.

(56) References Cited

U.S. PATENT DOCUMENTS

| | | | | |
|---|---|---|---|---|
| 5,416,626 | A * | 5/1995 | Taylor | 398/185 |
| 6,865,348 | B2 * | 3/2005 | Miyamoto et al. | 398/183 |
| 2003/0002765 | A1 | 1/2003 | Sharp | 385/2 |
| 2003/0170035 | A1 * | 9/2003 | Kisaka et al. | 398/183 |
| 2003/0198478 | A1 * | 10/2003 | Vrazel et al. | 398/183 |
| 2004/0061922 | A1 * | 4/2004 | Mauro et al. | 359/279 |
| 2004/0081470 | A1 * | 4/2004 | Griffin | 398/188 |
| 2004/0253000 | A1 * | 12/2004 | Grifin | 398/183 |
| 2005/0002676 | A1 * | 1/2005 | Zitelli | 398/188 |
| 2005/0074245 | A1 * | 4/2005 | Griffin | 398/188 |
| 2006/0013596 | A1 * | 1/2006 | Lazaro Villa et al. | 398/187 |

FOREIGN PATENT DOCUMENTS

EP 1 528 697 5/2005

OTHER PUBLICATIONS

Tokle et al. "6500 km Transmissionof RZ-DQPSK WDM Signals", Apr. 1, 2004, Electronics Letters, vol. 40, No. 7.*
T. Tokle, et al, "6500 km Transmission of RZ-DQPSK WDM Signals," *Electronics Letters*, IEE Stevenage, GB, vol. 40, No. 7, (Apr. 1, 2004), pp. 444-445.
A. Gnauck, "40-Gb/s RZ-Differential Phase Shift Keyed Transmission,"*Optical Society of America / IEEE, Tops*, vol. 86, (Mar. 23, 2003), pp. 450-451.
W. Bogner, et al, "40 Gbit/s Unrepeatered Optical Transmission Over 148km by Electrical Time Division Multiplexing and Demultiplexing," *Electronics Letters*, IEE Stevenage, GB, vol. 33, No. 25, (Dec. 4, 1997), pp. 2136-2137.
European Search Report, Appl. No. 05253821.2—2415 PCT/, (Aug. 31, 2005).

* cited by examiner

*Primary Examiner*—Frank G. Font
*Assistant Examiner*—Guy G Anderson

(57) ABSTRACT

An optical modulator is overdriven to increase its nonlinearity and therefore improve its response as it pertains to differential phase shift keyed (DPSK) transmission and a method of operating the same. In one embodiment, the MZM includes an MZM drive circuit coupled to the electrodes and configured to deliver to the electrode a DPSK drive signal bearing digital data and having a voltage that exceeds a normal drive voltage of the MZM by at least about 20%.

18 Claims, 9 Drawing Sheets

OPTICAL MODULATOR HAVING REDUCED BANDWIDTH REQUIREMENTS AND METHOD OF OPERATION THEREOF

TECHNICAL FIELD OF THE INVENTION

The present invention is directed, in general, to optical modulators for data communication and, more specifically, to an optical modulator having reduced bandwidth requirements and a method of operating the same.

BACKGROUND OF THE INVENTION

Optical transmission systems built around optical fibers have become widely used for broadband communication of digital data. Amplitude shift keying (ASK) is a modulation technique that is widely used for transforming the digital data into optical pulses carried by the optical fibers. Timeslots are defined for each bit of digital data to be transmitted. Optical pulses are generated during timeslots corresponding to "one" bits but not during timeslots corresponding to "zero" bits. In optical systems, ASK is often a non-return-to-zero (NRZ) transmission format. Hence, ASK is sometimes referred to as NRZ-ASK.

Differential phase shift keying (DPSK) is a competing modulation technique that is coming into use. DPSK's coding scheme assigns phase shifts to numbers. Timeslots are again defined, but unlike ASK, an optical pulse is generated during each timeslot. The optical pulse in each timeslot is phase-shifted from the optical pulse in the preceding timeslot as a function of the coding scheme to transmit the digital data from a transmitter to a receiver. DPSK, while more complicated to modulate and demodulate than ASK, has proven to offer a higher optical signal-to-noise ratio (OSNR), making it distinctly advantageous for long-haul optical transmission systems. DPSK can be an NRZ transmission format. Hence, DPSK is sometimes referred to as NRZ-DPSK.

Irrespective of whether the chosen format is ASK or DPSK, an optical carrier must still be modulated. An apparatus typically chosen to modulate an optical carrier is a Mach-Zehnder modulator (MZM). As those skilled in the pertinent art are familiar, an MZM has a pair of waveguide arms coupled at their ends. The optical carrier enters the MZM and is split between the waveguide arms. Electrodes associated with the waveguide arms receive a drive signal bearing the digital data that is to modulate the optical carrier. The electrodes cause the index of refraction of the waveguide arms to change such that, when the optical carriers recombine at the output end of the MZM, the resulting superposition yields the desired modulated optical pulsetrain.

MZMs are designed to receive a particular drive signal and switch with a particular switching response time. The switching response time defines the upper limit of the bandwidth of the optical pulsetrain they can produce. It is an absolutely paradigmatic to those skilled in the art that if a higher bandwidth optical pulsetrain is desired, an MZM that has been designed to be faster is required.

Unfortunately, the faster an MZM is designed to switch, the more power it consumes. Reducing power consumption in optical transmission systems is an important design goal, especially for long-haul systems. To compound matters, the MZM power consumption problem is bound to worsen as bandwidths of optical pulsetrains increase in the future.

Accordingly, what is needed in the art is an MZM that has a faster switching response time but that does not require concomitantly more power to switch.

SUMMARY OF THE INVENTION

The prior art is grounded in the belief that a particular MZM switches with a particular switching response time in response to a particular drive signal. If one wants to switch faster, one must substitute an MZM that has been designed to switch faster.

It is known that a given MZM will begin to respond nonlinearly if it is driven by a drive signal having a voltage higher than its switching voltage, which in essence causes it to switch faster than it was designed to switch. MZMs having a bandwidth that is too narrow for DPSK transmission can be "overdriven" to achieve a sufficient bandwidth and can still require less power than the higher bandwidth MZM that would have otherwise been required in its place. However, MZMs have only been overdriven in the context of ASK transmission, and only with limited success.

The present invention recognizes that the nonlinearity of the response of an MZM affects DPSK transmission far more than it affects ASK transmission and that overdriving an MZM decreases the linearity of the MZM's response. The result is that a dramatic and unexpected increase in the quality of the MZM output can result for DPSK transmissions by overdriving the MZM. The present invention can also take advantage of the recognition that the drive voltage for an MZM does not have to be enhanced to result in a nonlinearly enhanced MZM response. For example, while a 40 GB/s transmission rate can be achieved with a 30 GHz MZM, the present invention allows a 20 GHz MZM to be used in its place. Furthermore, the same drive voltage that was used for the 30 GHz MZM can now be used to overdrive the 20 GHz MZM; the drive voltage does not have to be enhanced.

In one aspect, the present invention provides an MZM. In one embodiment, the MZM includes an MZM drive circuit coupled to the electrode and configured to deliver to the electrode a DPSK drive signal bearing digital data and having a voltage set at a level that exceeds a normal drive voltage of the MZM by at least about 5%.

In another aspect, the present invention provides a method of driving an MZM having first and second waveguide arms coupled at ends thereof and an electrode associated therewith. In one aspect, the method includes: (1) delivering to the electrode a DPSK drive signal bearing digital data and having a voltage set at a level that exceeds a normal drive voltage of the MZM by at least about 5% and (2) causing, by the delivering, the MZM to exceed a normal response thereof.

In another aspect, the present invention provides an MZM having first and second waveguide arms coupled at ends thereof and electrodes associated therewith. In one embodiment, the MZM includes an MZM drive circuit coupled to the electrodes and configured to deliver to the electrodes a DPSK drive signal bearing digital data and having a voltage that exceeds a normal drive voltage of the MZM by at least about 15%.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
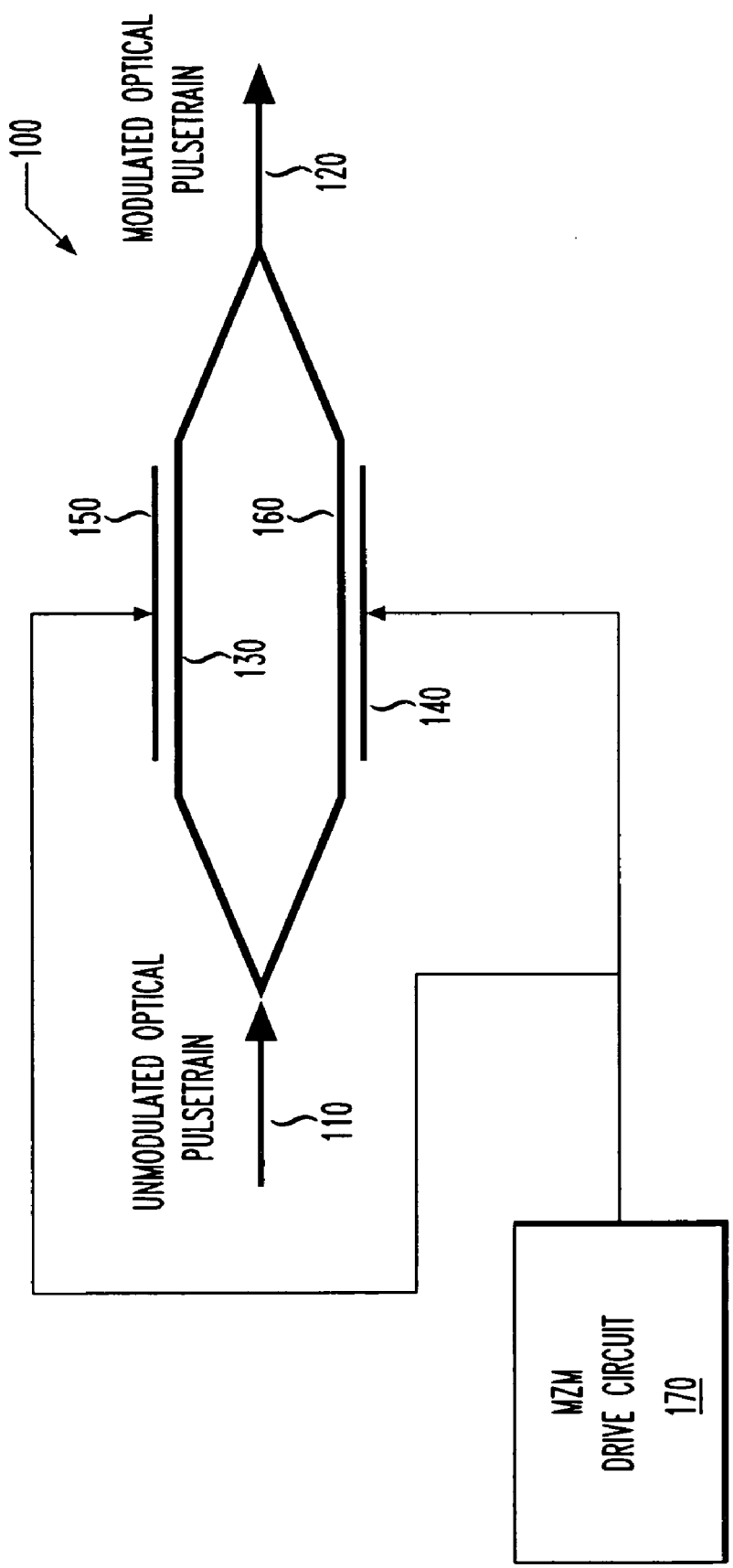
FIG. 1 illustrates a block diagram of one embodiment of an MZM having a drive circuit constructed according to the principles of the present invention.

Referring initially to FIG. 1, illustrated is a block diagram of one embodiment of an MZM, generally designated 100, having a drive circuit constructed according to the principles of the present invention. In FIG. 1, optical paths (waveguides) are represented by relatively heavy lines, and electrical paths (wires) are represented by relatively light lines. Arrowheads illustrate light or electricity flows and not physical structures.

The MZM 100 has an input 110 and an output 120. Interposing the input 110 and the output 120 are first and second waveguide arms 130, 140 coupled at ends thereof. First and second electrodes 150, 160 are respectively associated with the first and second waveguide arms 130, 140. As legends in FIG. 1 indicate, unmodulated continuous wave light or an unmodulated optical pulsetrain enters the MZM 100 at its input 110, splits to travel in both the first and second waveguide arms 130, 140 and recombines to form a modulated optical pulsetrain at the output 120.

The first and second electrodes 150, 160 carry a DPSK drive signal that changes the index of refraction of the first and second waveguide arms 130, 140, respectively. The change in index of refraction in one or both of the first and second waveguide arms 130, 140 causes an interference to occur when the split optical pulsetrain recombines at the output 120. The drive signal is called a DPSK drive signal, because the recombined optical pulsetrain is a DPSK pulsetrain.

The MZM 100 includes an MZM drive circuit 170. The MZM drive circuit 170 is coupled to at least one of the electrodes 150, 160 and is configured to deliver to the electrodes a DPSK drive signal bearing digital data. In the illustrated embodiment, the DPSK drive signal has a voltage set at a level that exceeds a normal drive voltage of the MZM by at least about 5%.

"Set at a level" means that the DPSK drive signal voltage is deliberately set to "overdrive" the MZM, and is not the result of an unintended voltage spike or excursion that causes the DPSK drive signal temporarily to exceed its setpoint. "Set at a level" further does not encompass unintended, usually small, higher drive voltages resulting from component variations in the MZM drive circuit 170 or other unintended, perhaps parasitic, effects. In alternative embodiments, the voltage exceeds the normal drive voltage of the MZM by at least about 15%, 30%, 50%, 80% or an even larger amount, depending upon the response characteristic sought for a particular application.

Having broadly introduced the structure and function of an MZM constructed according to the principles of the present invention, some theory behind the operation of the MZM will now be set forth.

To elaborate on what has been mentioned above, ASK modulation and DPSK modulation are technologically important transmission formats for high bit rate fiber optic communications. DPSK has been demonstrated to have an approximate 3 dB lower optical signal to noise ratio (OSNR) requirement for a given transmission bit error rate as compared to ASK. The reduced OSNR requirement for DPSK is predominantly due to the use of balanced detection at the receiver, which stands in contrast to standard single-ended detection typically used for ASK. Consequently, significant improvements in transmission distance at 40 gigabits per second (Gb/s) can be realized from the use of DPSK over ASK.

However, DPSK has stringent requirements for the transmitter electro-optic modulator. This can increase the cost of components in the transmitter, particularly at transmission bit rates of about 40 Gb/s. Therefore, it is important to understand the transmitter performance criteria for both the DPSK and ASK formats since transmitter issues result in a per-channel cost impact to the system.

The quality of the NRZ-ASK and NRZ-DPSK formats produced by an MZM will now be considered as a function of modulator bandwidth. Power penalty estimates based on a consideration of bit pattern eye opening indicates that the DPSK transmission format has a fundamentally lower modulator bandwidth requirement as compared to the ASK format. In fact, it has been observed that the DPSK format requires an MZM with a bandwidth that is only about two-thirds that typically required for ASK transmission. Furthermore, these observations are equally applicable to higher constellation PSK (e.g., differential quadrature phase shift keying, or DQPSK) formats that are created by driving an MZM at twice its switching voltage.

Eye opening is a common measure of the quality of an optical bit sequence. Those skilled in the pertinent art understand the relationship between the required optical signal to noise ratio (OSNR) for a specified bit error rate (BER) within a transmission link and the received eye opening. The nature of the relationship between eye opening and the OSNR requirements of a system are dependent on the nature of the system impairments that result from transmission. Although the eye opening is not an entirely reliable indication of OSNR requirements, it is still a useful measure of general signal quality.

The finite frequency response of a fiber optic system creates a broadening of both the upper and lower data rails, which degrades the quality of the received bit sequence. A commonly used measure of signal degradation is the power penalty (PP), which can be loosely related to the required OSNR for a given BER in a practical transmission system. The power penalty is defined as:

$$PP = 20 * \log_{10}\left(\frac{\sqrt{P_1} - \sqrt{P_0}}{\sqrt{P'_1} - \sqrt{P'_0}}\right), \quad (1)$$

where $P_{1,0}$ and $P'_{1,0}$ are the specified reference signal power levels and the specified power levels at the receiver of a "1" and a "0," respectively. The quantity in the parenthesis is commonly known as the "eye opening" and is a convenient and basic measure of signal quality. The expected optical signal to noise ratio can be generally inferred from PP.

Figure 2:
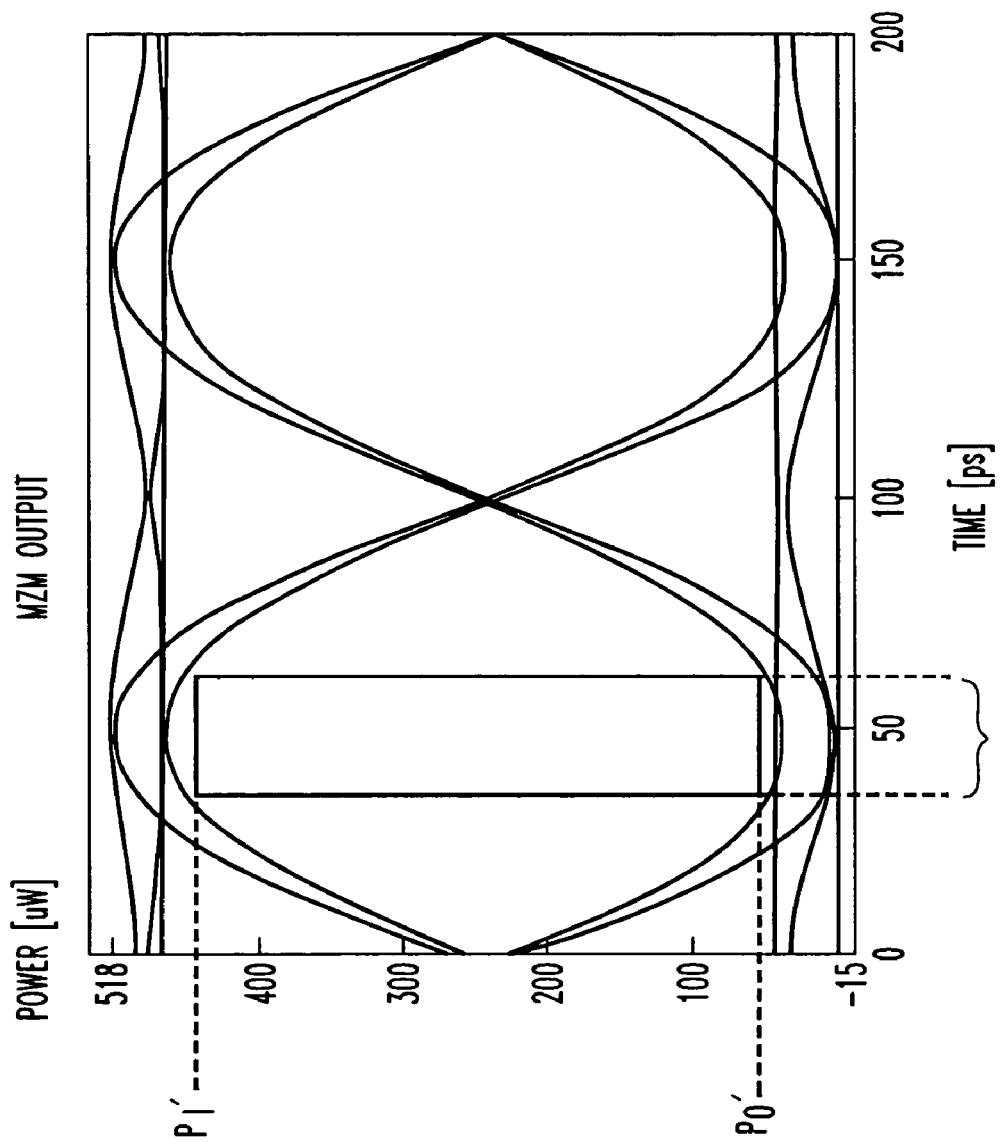
FIG. 2 graphically illustrates an eye mask typically used to define power levels used to determine eye-opening.

Turning now to FIG. 2, graphically illustrated is an eye mask typically used to define power levels used to determine eye-opening. In FIG. 2, the upper rail, A, is defined as the lowest inner upper eye trace to intersect the eye mask. The lower rail, B, is defined as the highest inner lower eye trace to intersect the eye mask as determined by a timing window. The timing window represents the worst-case phase uncertainty in the sampling of the receiver decision circuitry. The signal power penalty can then be estimated from the eye opening measurement according to equation (1).

Equation (1) indicates that the power penalty of the signal is particularly sensitive to degradation in the zero-rail level, $P_0$ and $P'_0$. However, $P_0$ is generally assumed to be equal to zero. Also, equation (1) indicates that the power penalty varies in proportion to the field levels of the data rails rather than the power levels.

Figure 3:
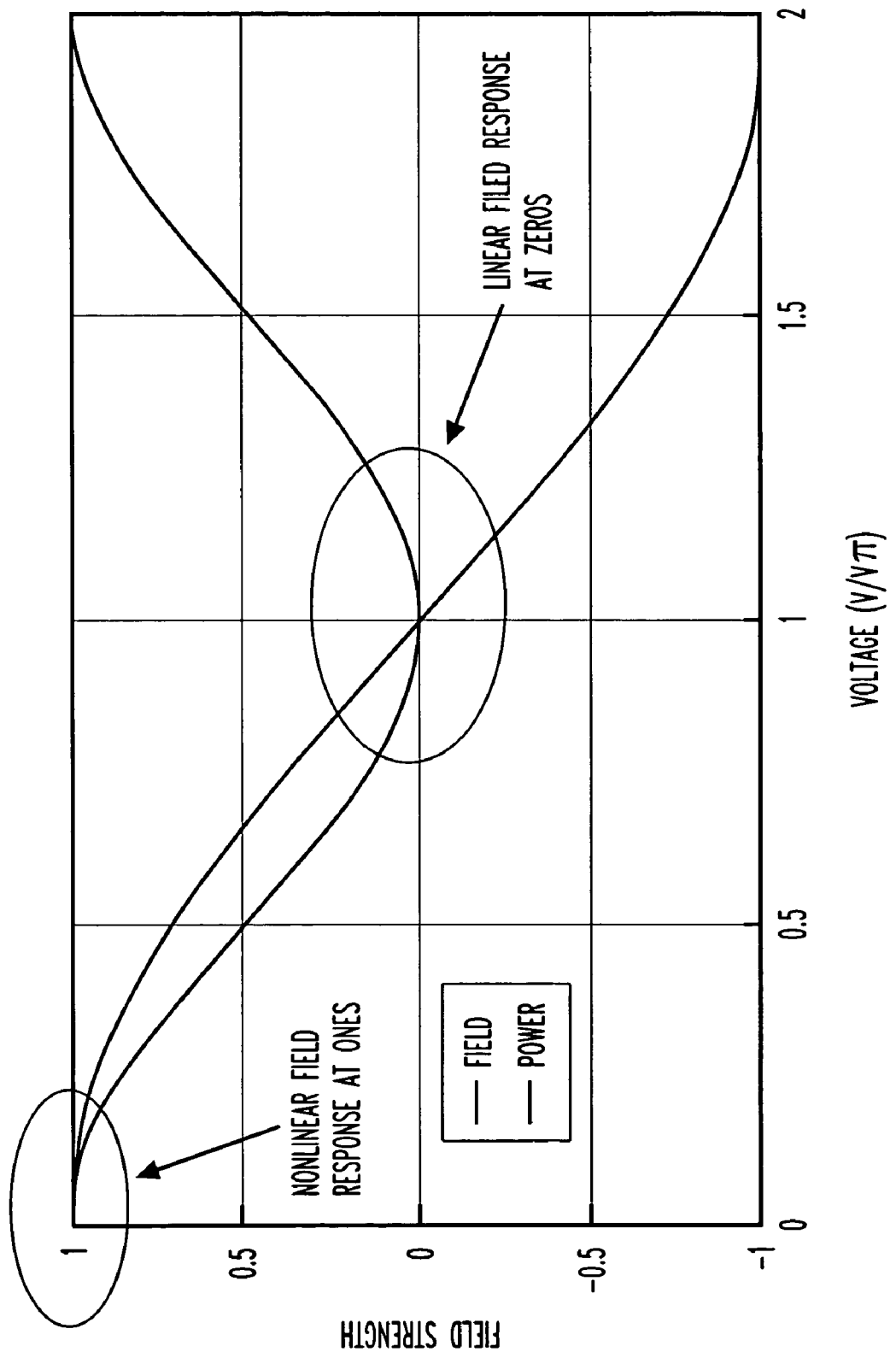
FIG. 3 graphically illustrates a cosine field strength output response to an applied voltage by an MZM.
Figure 4:
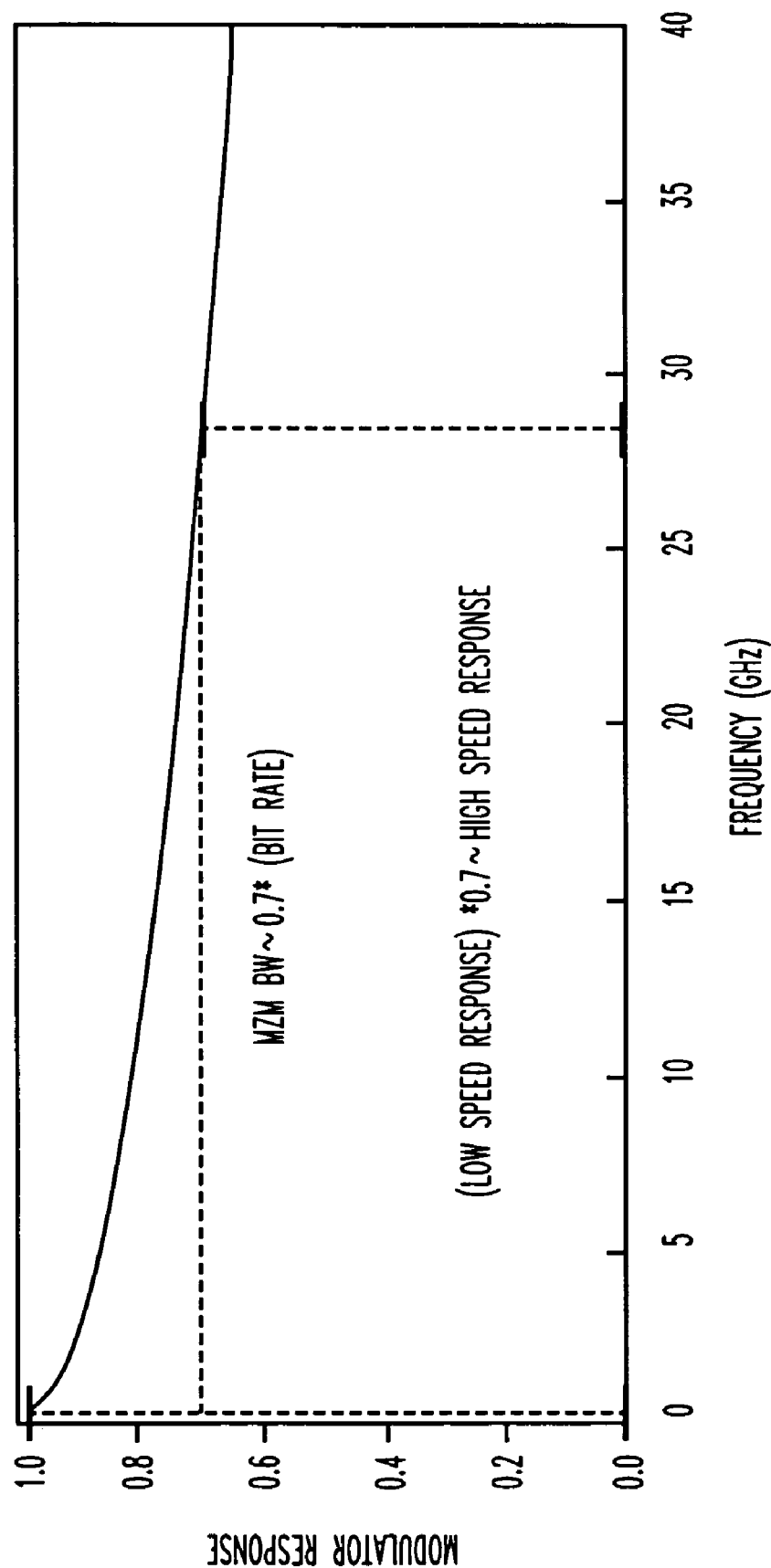
FIG. 4 graphically illustrates a theoretical frequency response for an MZM with a 28 GHz bandwidth.

The basic response of an MZM and how it creates ASK formats will now be discussed. Accordingly, turning now to FIG. 3, graphically illustrated is a cosine field strength output response to an applied voltage by an MZM. A cosine field output response to an applied voltage corresponds to a cosine-squared response for power. Consequently, when an MZM is driven to produce an ASK bit sequence its large signal power response is similar for the ones rail and the zeros rail; however, the field response is not. Specifically, the MZM field response for the ones rail is the result of a strongly nonlinear transfer function. Whereas the field response of the zeros rail is quite linear, in fact, the zeros-rail part of the MZM response is actually most sensitive to variations in drive voltage. In contrast, the field response of the ones rail is created by the most nonlinear part of the modulator response and consequently has a minimal sensitivity to variations in input voltage. FIG. 4 graphically illustrates a theoretical frequency response for an MZM with a 28 GHz bandwidth.

Figure 5:
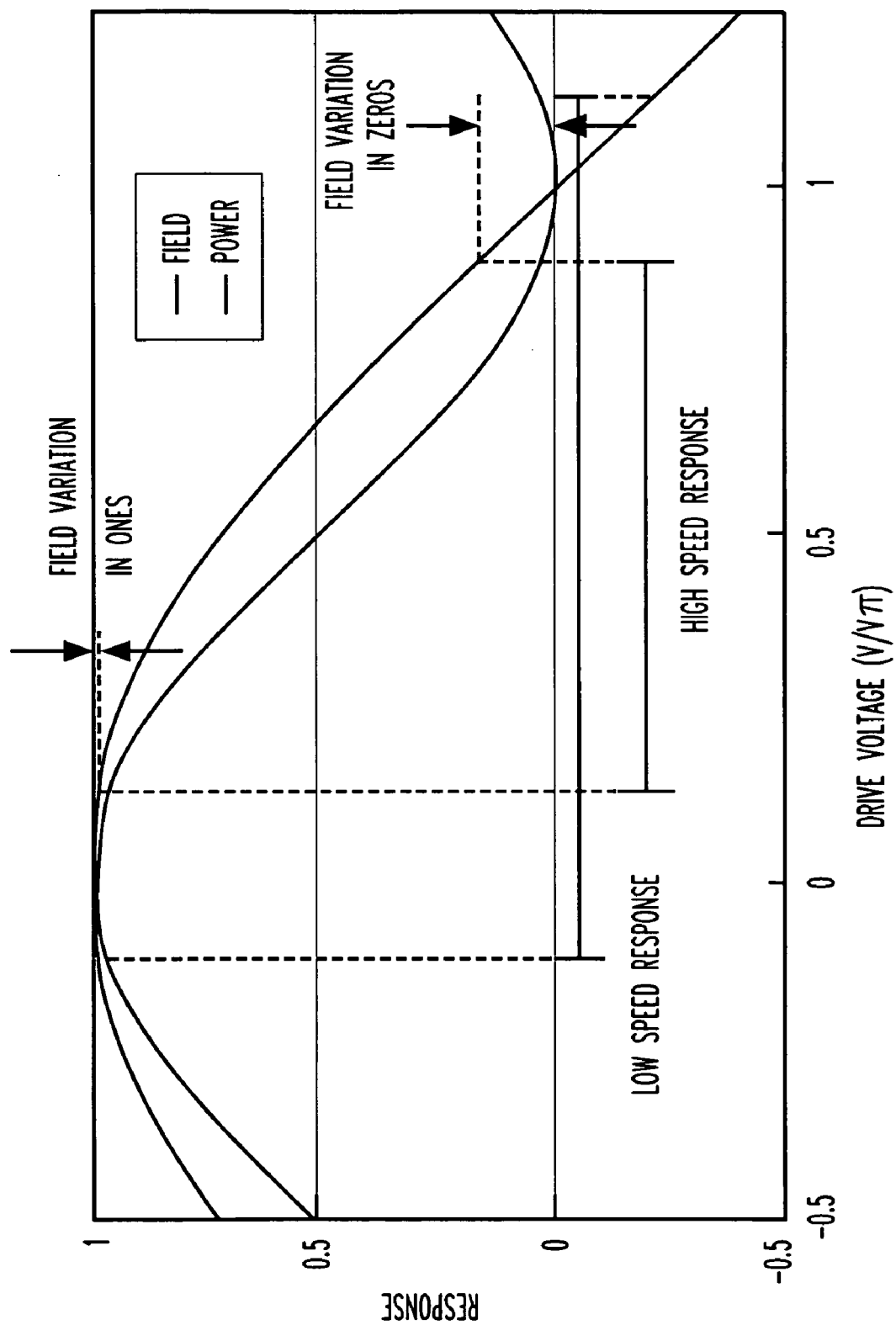
FIG. 5 graphically illustrates the impact that the finite frequency response of the MZM of FIG. 4 has on an ASK bit sequence.

Turning now to FIG. 5, graphically illustrated is the impact that the finite frequency response of the MZM of FIG. 4 has on an ASK bit sequence. From a perspective of the optical field, it is apparent that the intrinsic response limitations of the MZM more adversely affect the zeros rail than the ones rail. Therefore, as the modulator bandwidth is limited, MZMs are predisposed to create a relatively large power penalty for ASK formats. Alternately stated, the intrinsic large signal response of a finite bandwidth MZM is not ideally suited to the production of an ASK optical bit sequence.

Figure 6:
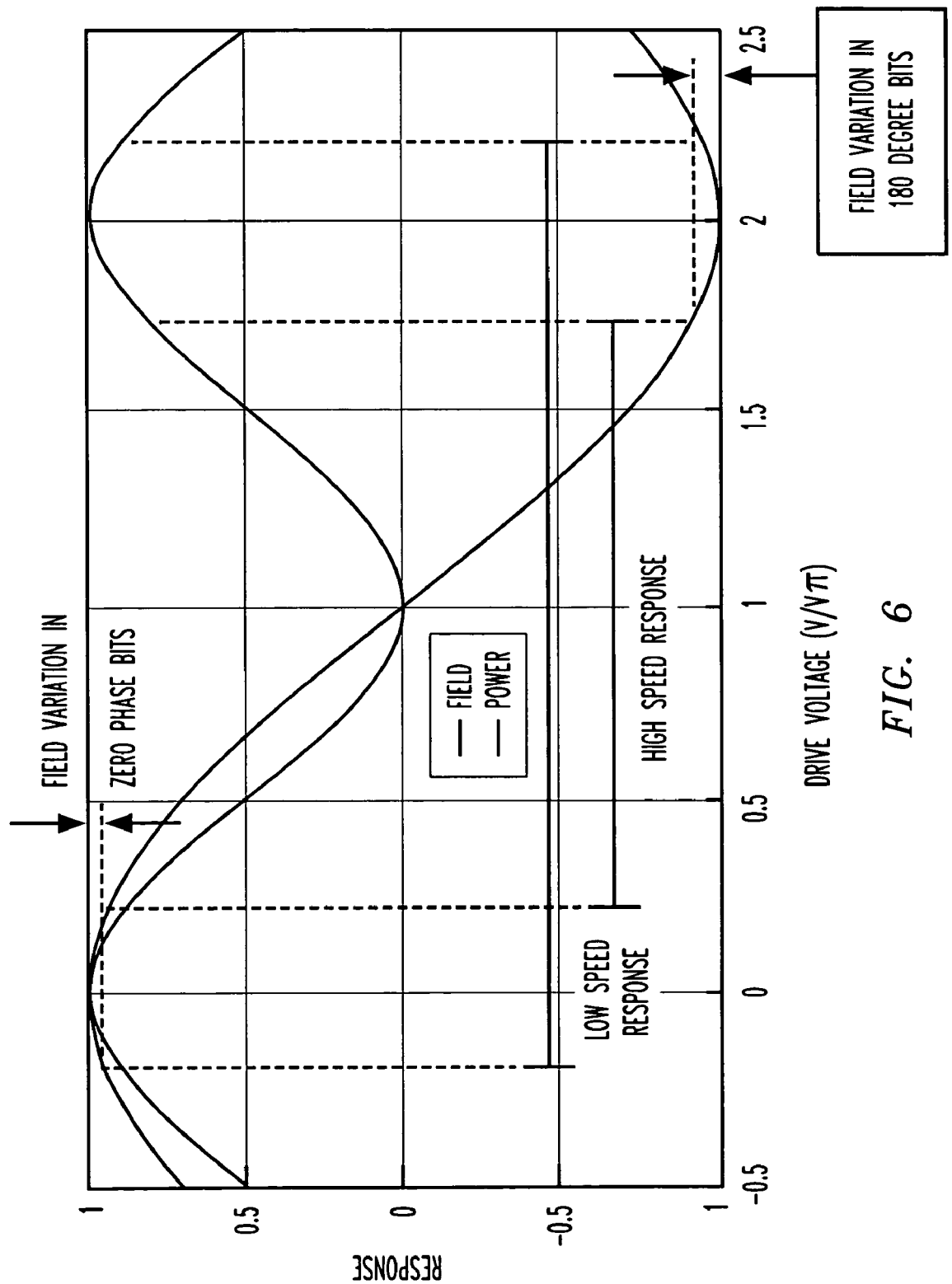
FIG. 6 graphically illustrates the impact that the finite frequency response of the MZM of FIG. 4 has on a DPSK bit sequence.

Turning now to FIG. 6, graphically illustrated is the impact that the finite frequency response of the MZM of FIG. 4 has on a DPSK bit sequence. As stated above, DPSK calls for a light pulse (energy) in every time slot. The information is encoded in an optical phase change, or a lack of a change in phase, between successive bits. This format can be achieved by driving an MZM from one maximum output to a neighboring maximum output in its transfer function with twice its normal switching voltage, $2*V_\pi$, or 100% in excess of the normal drive voltage of the MZM. Consequently, the modulator is driven from the "zero phase" ones rail to the "180-degree phase" ones rail in the MZM transfer function. Therefore, in this circumstance, the modulator is less susceptible to power penalty degradations as the MZM bandwidth is reduced, since the endpoints in the MZM transfer function both terminate on the very nonlinear part of the MZM transfer function. Alternately stated, the intrinsic large signal response of a finite bandwidth MZM is relatively well suited to the production of a DPSK optical bit sequence. The present invention can take advantage of this recognition by overdriving to reduce the linearity of the MZM's transfer function.

Figure 7:
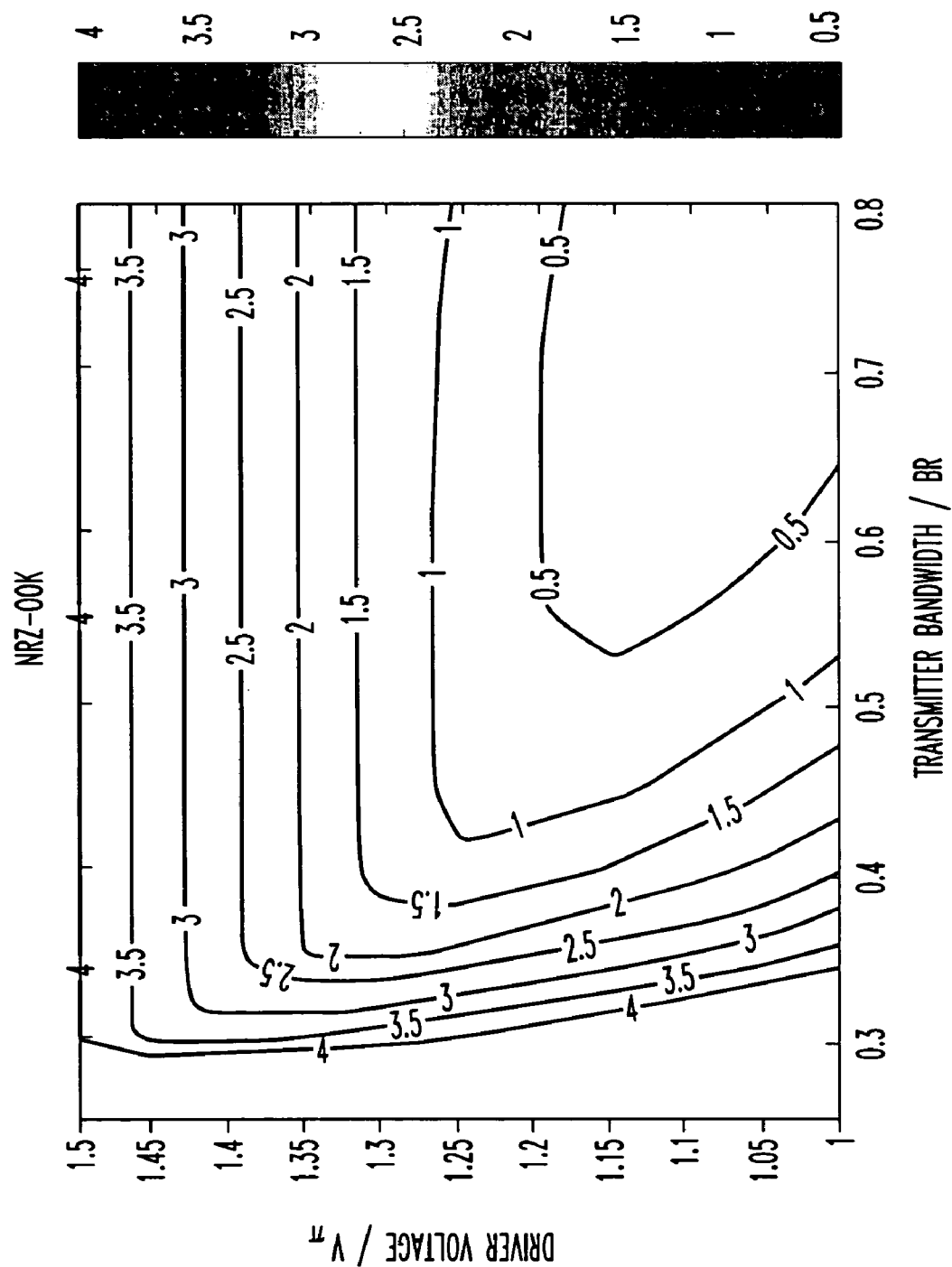
FIG. 7 graphically illustrates the expected power penalty versus modulator bandwidth and driver voltage for an NRZ-ASK (also called on-off keying, or OOK) bit sequence.

Turning now to FIG. 7, graphically illustrated is the expected power penalty versus modulator bandwidth and driver voltage for an NRZ-ASK (or OOK) bit sequence. In FIG. 7, the MZM frequency limitation was simulated with an electrical Gaussian low-pass filter. The timing window in the receiver decision circuit for these simulations was assumed to be about 20% of the bit rate.

Figure 8:
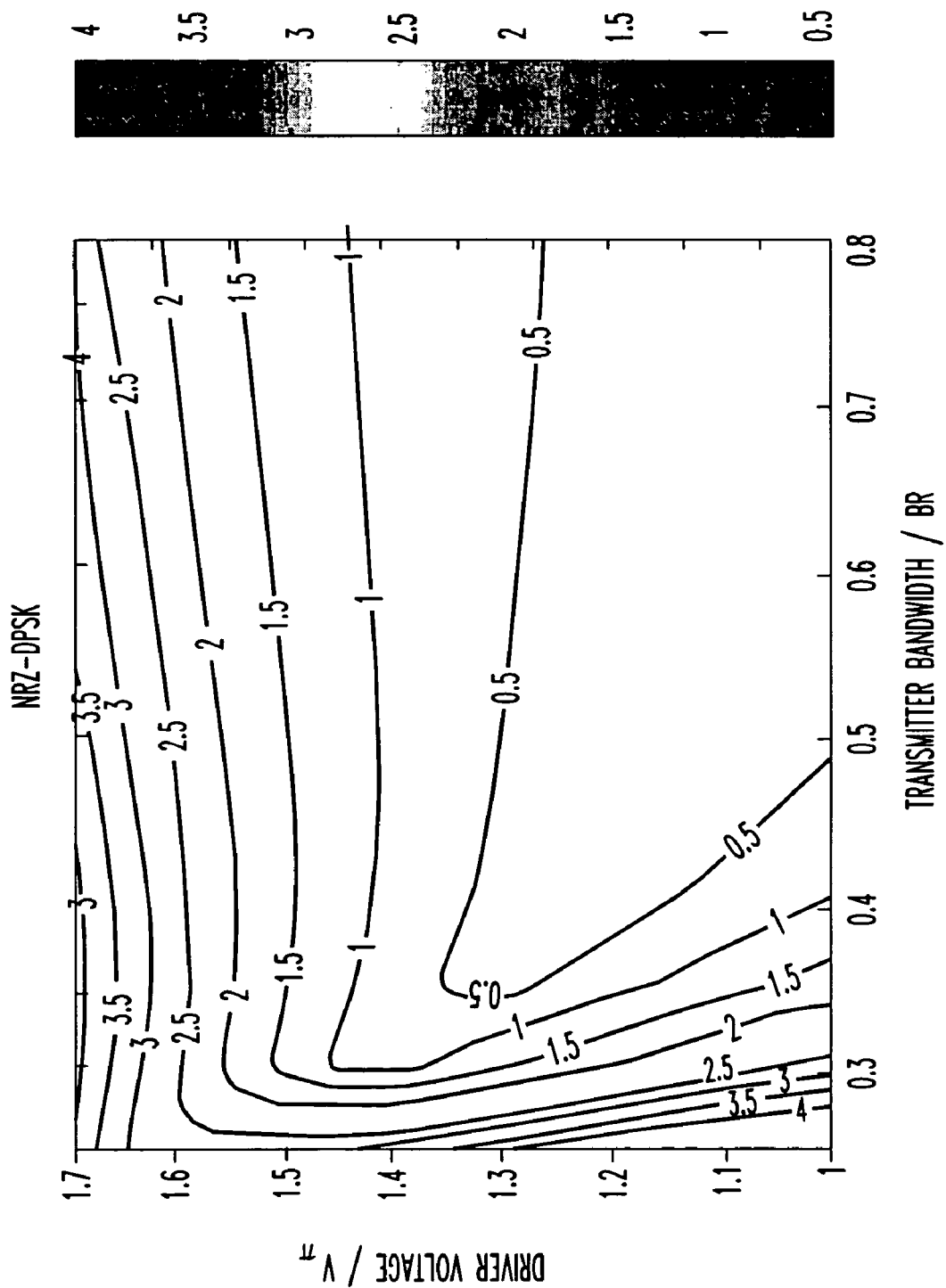
FIG. 8 graphically illustrates the expected power penalty versus modulator bandwidth and driver voltage for an NRZ DPSK bit sequence.

Turning now to FIG. 8, graphically illustrated is the expected power penalty versus modulator bandwidth and driver voltage for an NRZ-DPSK bit sequence. A comparison of these two graphs clearly shows that the DPSK format is much less susceptible to a reduction in the MZM bandwidth, which results in a much smaller power penalty for DPSK as compared to ASK when the MZM bandwidth is limited. These graphs indicate that the DPSK format can tolerate an MZM with a bandwidth of about 35% of the bit rate whereas the ASK format requires an MZM with a bandwidth of about 55% of the bit rate. Note that for these simulations it is assumed that the only bandwidth limitation in the transmitter is from the MZM. Under these circumstances the DPSK MZM requires approximately 65% of the bandwidth required for an ASK MZM to have a maximum power penalty of about 0.5 dB in the transmitted signal.

FIG. 7 also indicates that under the circumstances outlined above, the ASK-MZM is optimally driven at 1.15 times (or 15% in excess of) its normal drive voltage at DC while the DPSK-MZM is optimally driven at 1.3 times (or 30% in excess of) its normal drive voltage. However, the DPSK-MZM requires a smaller bandwidth MZM. Therefore, due to the basic MZM bandwidth/drive voltage relationship that dictates that a smaller bandwidth modulator should have a smaller drive voltage, the drive voltage required for the DPSK-MZM should remain relative unchanged. A comparison can be made between the expected MZM performance characteristics of two MZMs that are identical in design, except that one has a longer microwave/optical interaction region than the other. In said comparison, we consider MZMs with a bandwidth of 20 GHz and 30 GHz, for 40 Gb/s DPSK and ASK transmission, respectively. These specific bandwidths are greater than the 35% and 55% rates previously discussed since some other bandwidth limiting components are assumed to be in the transmitter. The 20 GHz bandwidth MZM is expected to have a drive voltage that is about 20% lower than that of the 30 GHz MZM. Therefore, even though the 20 GHz DPSK- MZM needs to be more overdriven than the 30 GHz ASK-MZM, a significant change in drive voltage is not required, since the lower bandwidth modulator requires a lower switching voltage.

From the above, it is apparent that, assuming the MZM is the bandwidth-limiting component in the transmitter, the signal power penalty for a DPSK signal can be kept below 0.5 dB with the use of an MZM that has a bandwidth that is about 35% of the bit rate, whereas an ASK-MZM requires a bandwidth of 55% of the bit rate for similar performance. The realization that the DPSK format requires a smaller bandwidth transmitter may help reduce DPSK component costs for high bit rate systems.

Figure 9:
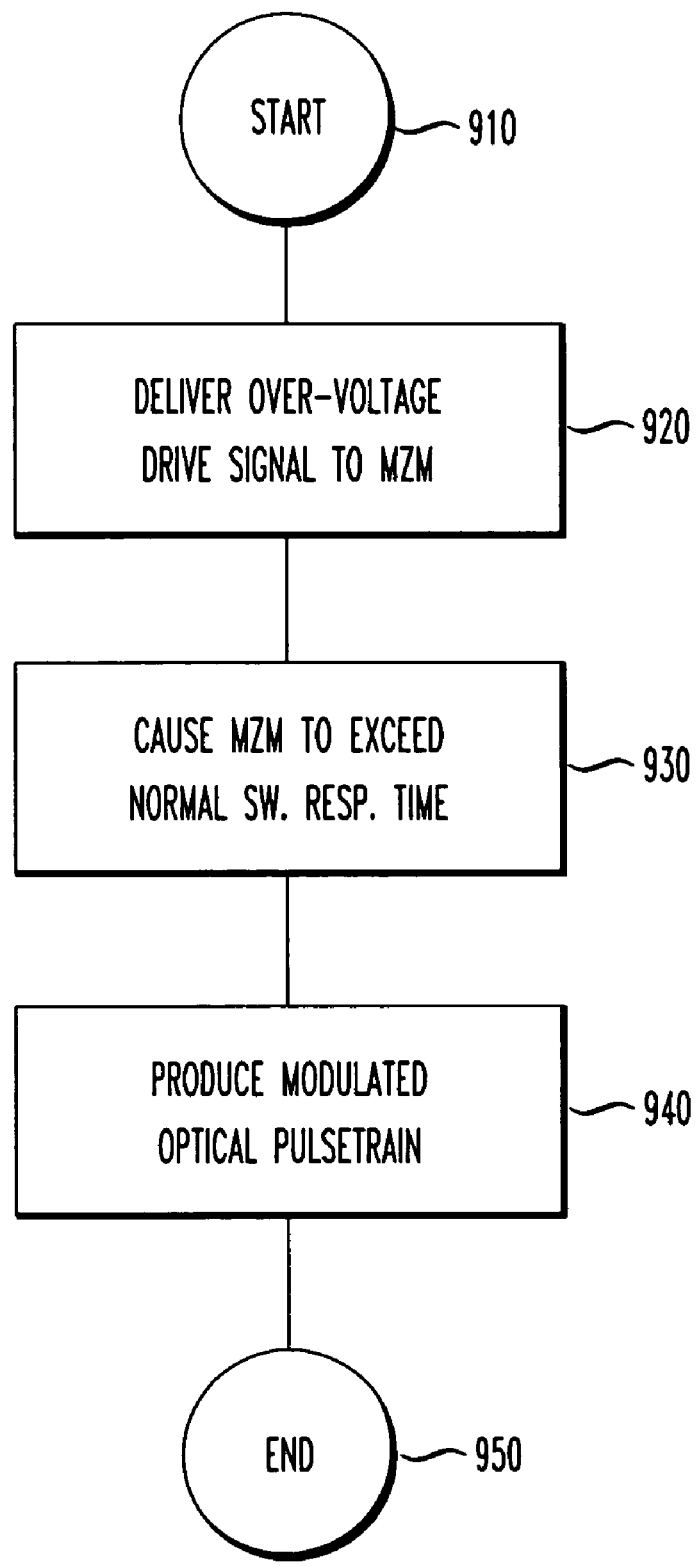
FIG. 9 illustrates a flow diagram of one embodiment of a method of driving an MZM carried out according to the principles of the present invention.

Turning now to FIG. 9, illustrated is a flow diagram of one embodiment of a method of driving an MZM carried out according to the principles of the present invention.

The method begins in a start step 910, wherein it is desired to create a modulated pulsetrain. The method proceeds to a step 920, in which a DPSK drive signal is delivered to at least one electrode in a DPSK-configured MZM. The DPSK drive signal bears digital data and has a voltage set at a level that exceeds a normal drive voltage of the MZM by at least about 5%. The method proceeds to a step 930, in which, by the delivering, the MZM is caused operate nonlinearly, which causes it to exceed its normal response. In a step 940, the MZM produces a modulated pulsetrain. The method ends in an end step 950.

Although the present invention has been described in detail, those skilled in the art should understand that they can make various changes, substitutions and alterations herein without departing from the spirit and scope of the invention in its broadest form.

What is claimed is:

1. A method of driving a Mach-Zehnder modulator (MZM) having first and second waveguide arms coupled at ends thereof and electrodes associated therewith, said method comprising:
delivering to said electrodes a differential phase shift keyed (DPSK) drive signal bearing digital data at a rate at least twice a bandwidth of said MZM, and having a voltage controlling each waveguide arm of said MZM set at a level that exceeds a halfwave voltage, $V_\pi$, of said MZM by at least 5%.

2. The method as recited in claim 1 wherein said voltage exceeds said $V_\pi$ of said MZM by at least 15%.

3. The method as recited in claim 1 wherein said voltage exceeds said $V_\pi$ of said MZM by at least 30%.

4. The method as recited in claim 1 wherein a power penalty of said MZM at said data rate is substantially minimized.

5. The method as recited in claim 1 wherein said MZM produces a differential quadrature phase shift keyed (DQPSK) optical pulsetrain.

6. The method as recited in claim 1 wherein said MZM operates at about a 40 GB/s rate.

7. The method as recited in claim 1 wherein said MZM has a bandwidth that is at most 40% of said rate of said digital data.

8. An optical communication system comprising:
a Mach-Zehnder Modulator (MZM) having first and second waveguide arms coupled at ends thereof and electrodes associated therewith; and
an MZM drive circuit coupled to said electrodes and configured to deliver to said electrodes a differential phase shift keyed (DPSK) drive signal bearing digital data at a bit rate at least twice a nominal bandwidth of said MZM, wherein a voltage controlling each waveguide arm of said MZM is set at a level that substantially minimizes a power penalty at said bit rate.

9. The optical communication system as recited in claim 8, wherein said controlling voltage exceeds a halfwave voltage, $V_\pi$, of said MZM.

10. The optical communication system as recited in claim 8, wherein said nominal bandwidth is less than about 35% of said bit rate.

11. The optical communication system as recited in claim 8, wherein said MZM is configured to produce a differential quadrature phase shift keyed (DQPSK) optical pulsetrain.

12. The optical communication system as recited in claim 8, wherein said MZM operates at about a 40 GB/s rate.

13. A method of operating a Mach-Zehnder Modulator (MZM) comprising the steps of:
modulating a voltage that controls a phase shift in waveguide arms of said MZM at a modulation rate at least twice a nominal bandwidth of said MZM; and
selecting a level of said voltage to substantially minimize a power penalty at said modulation rate.

14. The method as recited in claim 13, wherein said nominal bandwidth is less than about 35% of said rate.

15. The method as recited in claim 13, wherein modulating said voltage produces a differential quadrature phase shift keyed (DQPSK) optical pulsetrain.

16. The method as recited in claim 13, wherein said MZM operates at about a 40 GB/s rate.

17. The method as recited in claim 13, wherein said voltage level is greater than a halfwave voltage, $V_\pi$, of said MZM.

18. The method as recited in claim 17 wherein said voltage exceeds said $V_\pi$ by at least 30%.

* * * * *